(12) United States Patent
Sekiguchi

(10) Patent No.: US 11,082,912 B2
(45) Date of Patent: Aug. 3, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Shiho Sekiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/688,419

(22) Filed: Nov. 19, 2019

(65) Prior Publication Data

US 2020/0169948 A1 May 28, 2020

(30) Foreign Application Priority Data

Nov. 22, 2018 (JP) .............................. JP2018-219686

(51) Int. Cl.
| | |
|---|---|
| *H04W 48/16* | (2009.01) |
| *H04W 48/20* | (2009.01) |
| *H04W 88/08* | (2009.01) |
| *H04W 84/12* | (2009.01) |
| *H04N 1/00* | (2006.01) |

(52) U.S. Cl.
CPC ........ *H04W 48/16* (2013.01); *H04N 1/00973* (2013.01); *H04W 48/20* (2013.01); *H04W 88/08* (2013.01)

(58) Field of Classification Search
CPC ..... H04W 48/16; H04W 48/20; H04W 88/08; H04W 84/12; H04N 1/00973

USPC .......................................................... 370/329
See application file for complete search history.

(56) References Cited

U.S. PATENT DOCUMENTS

| | | | |
|---|---|---|---|
| 2012/0254614 A1* | 10/2012 | Kimura ................. | H04W 12/04 713/168 |
| 2017/0041977 A1* | 2/2017 | Yokoyama .............. | H04L 63/10 |
| 2018/0234840 A1 | 8/2018 | Nakamura | |
| 2018/0329993 A1* | 11/2018 | Bedadala ................ | G10L 15/26 |
| 2020/0050753 A1* | 2/2020 | Davis .................. | G06F 21/6218 |

FOREIGN PATENT DOCUMENTS

JP 2018-129770 A 8/2018

* cited by examiner

*Primary Examiner* — Inder P Mehra
(74) *Attorney, Agent, or Firm* — Canon U.S.A., Inc. IP Division

(57) ABSTRACT

A control method for an information processing apparatus includes establishing a connection between the information processing apparatus and a communication apparatus, and transmitting, to the communication apparatus via a connection between the information processing apparatus and the communication apparatus, an execution instruction for connection processing that is based on any one of AirStation One-Touch Secure System (AOSS) and Wi-Fi Protected Setup (WPS), wherein, in a case where the execution instruction has been received by the communication apparatus, the connection processing is performed by the communication apparatus, and wherein, in a connection between the communication apparatus and an access point to be established by the connection processing, the access point operates as a master device and the communication apparatus operates as a slave device.

18 Claims, 9 Drawing Sheets

INFORMATION PROCESSING APPARATUS, CONTROL METHOD, AND STORAGE MEDIUM

BACKGROUND

Field of the Disclosure

Aspects of the present disclosure generally relate to an information processing apparatus, a control method, and a storage medium.

Description of the Related Art

There is known connection processing (simple connection processing) that is based on a standard used to establish a connection without receiving inputting of connection information such as a password, which is typified by Wi-Fi Protected Setup (WPS).

Japanese Patent Application Laid-Open No. 2018-129770 discusses a printer which is capable of connecting to an access point by a "WPS push button method" or a "WPS PIN code method".

Furthermore, with the popularization of a communication apparatus or an access point which is capable of performing simple connection processing, causing simple connection processing to be simply performed by a communication apparatus is desired.

SUMMARY

Some embodiments are generally directed to causing simple connection processing to be simply performed by a communication apparatus.

According to some embodiments, a control method for an information processing apparatus includes establishing a connection between the information processing apparatus and a communication apparatus, and transmitting, to the communication apparatus via a connection between the information processing apparatus and the communication apparatus, an execution instruction for connection processing that is based on any one of AirStation One-Touch Secure System (AOSS) and Wi-Fi Protected Setup (WPS), wherein, in a case where the execution instruction has been received by the communication apparatus, the connection processing is performed by the communication apparatus, and wherein, in a connection between the communication apparatus and an access point to be established by the connection processing, the access point operates as a master device and the communication apparatus operates as a slave device.

Further features of various embodiments will become apparent from the following description of exemplary embodiments with reference to the attached drawings.

DESCRIPTION OF THE EMBODIMENTS

Various exemplary embodiments, features, and aspects will be described in detail below with reference to the drawings. Furthermore, the following exemplary embodiments are not intended to limit the claims, and the combinations of features described in the exemplary embodiments are not essential for every embodiment. In the following description, an example in which a printer is used as one of apparatuses is described.

A terminal apparatus and a communication apparatus according to an exemplary embodiment are described. In the present exemplary embodiment, a personal computer (PC) is used as an example of the terminal apparatus. Furthermore, the terminal apparatus is not limited to a PC, but only needs to be an apparatus capable of communicating with a communication apparatus described below. Examples of the terminal apparatus include a digital camera, a mobile phone, a smartphone, a tablet terminal, and a personal digital assistant (PDA). Moreover, while, in the present exemplary embodiment, a multifunction printer (MFP), which is capable of providing a copying service, a facsimile (FAX) service, and a printing service, is used as an example of the communication apparatus, the present exemplary embodiment is not limited to this. Various types of apparatuses can be used as the communication apparatus as long as those are capable of communicating with the terminal apparatus. For example, examples of the communication apparatus used as a printer include an inkjet printer, a full-color laser beam printer, and a monochrome printer. Moreover, examples of the communication apparatus further include apparatuses capable of providing services other than printing, such as a copying machine, a facsimile apparatus, a smartphone, a mobile phone, a PC, a tablet terminal, a PDA, a digital camera, a music playback device, a storage, a projector, and a smart speaker. Furthermore, the smart speaker is an apparatus which is used to issue an instruction to a device present in the same network to perform processing according to a voice command issued by the user or to notify the user of information acquired via a network in response to a voice command issued by the user. Additionally, the communication apparatus further includes a single-function printer (SFP), which includes a single function.

<System Configuration>

Figure 1:
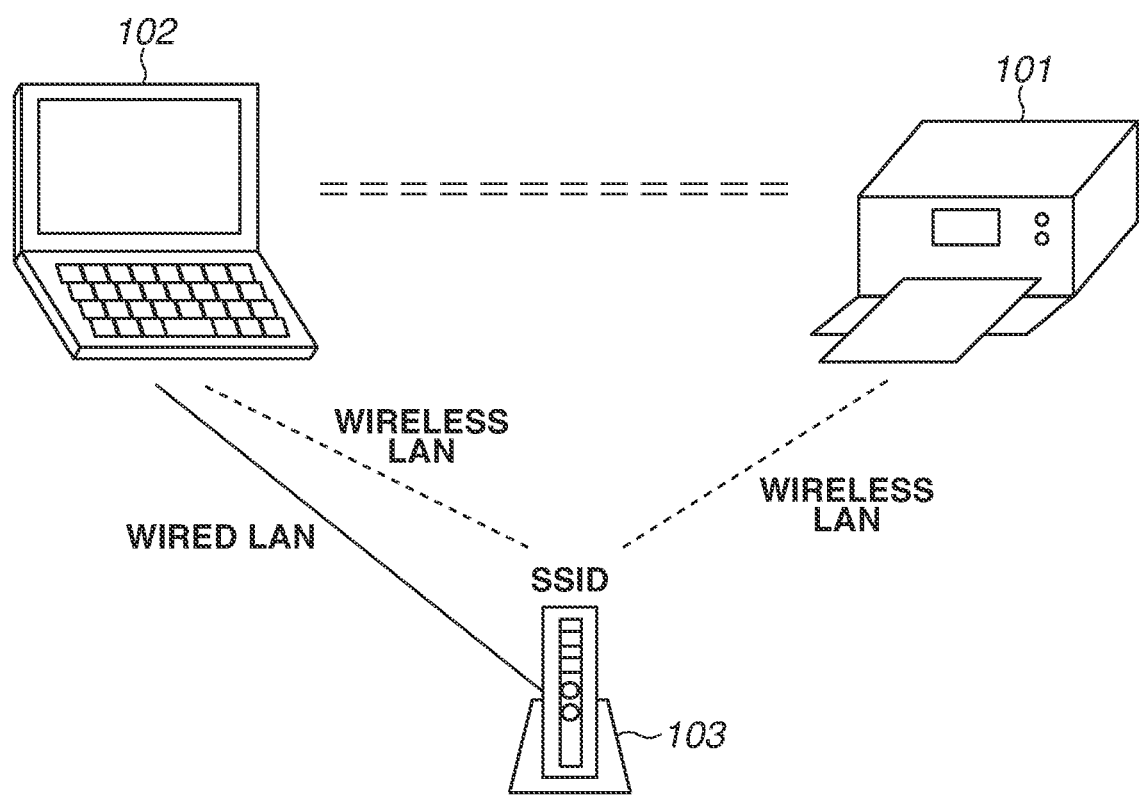
FIG. 1 is a system configuration diagram of an exemplary embodiment.

FIG. 1 is a system configuration diagram of the present exemplary embodiment. An information processing apparatus 102 is a terminal apparatus employed in the present exemplary embodiment. A communication apparatus 101 is a communication apparatus employed in the present exemplary embodiment. An access point (AP) 103 is an external apparatus located outside the information processing apparatus 102 and outside the communication apparatus 101. Furthermore, the external apparatus can be an apparatus capable of relaying communications other than an access point. Specifically, the AP 103 is, for example, a device such as a wireless local area network (LAN) router.

The information processing apparatus 102 and the communication apparatus 101 are able to connect to the AP 103. Then, the information processing apparatus 102 is able to communicate with the communication apparatus 101 via the AP 103. The method in which a terminal apparatus and a communication apparatus connect to each other via an AP in the above-mentioned way is generally called an infrastructure connection. The infrastructure connection enables building out a network environment in which each apparatus is enabled to mutually communicate with a plurality of devices. On the other hand, a method in which only two devices, i.e., a terminal apparatus and a communication apparatus, directly connect to each other without via an AP is called a direct connection.

In the present exemplary embodiment, the infrastructure connection and the direct connection employed between the information processing apparatus 102 and the communication apparatus 101 are assumed to be a connection performed by a communication method that is based on the standard of IEEE 802.11 series. The communication method that is based on the standard of IEEE 802.11 series is, specifically, Wi-Fi® (Wireless Fidelity). Furthermore, the communication method for use in each connection is not limited to this configuration, but can be, for example, Bluetooth® or Wi-Fi Aware.

Hardware configurations of the information processing apparatus 102 and the communication apparatus 101 are described with reference to the block diagram of FIG. 2. Moreover, while the present exemplary embodiment is described with the following configuration thereof taken as an example, the present exemplary embodiment is not intended to limit the functions thereof to those described in FIG. 2.

Figure 2:
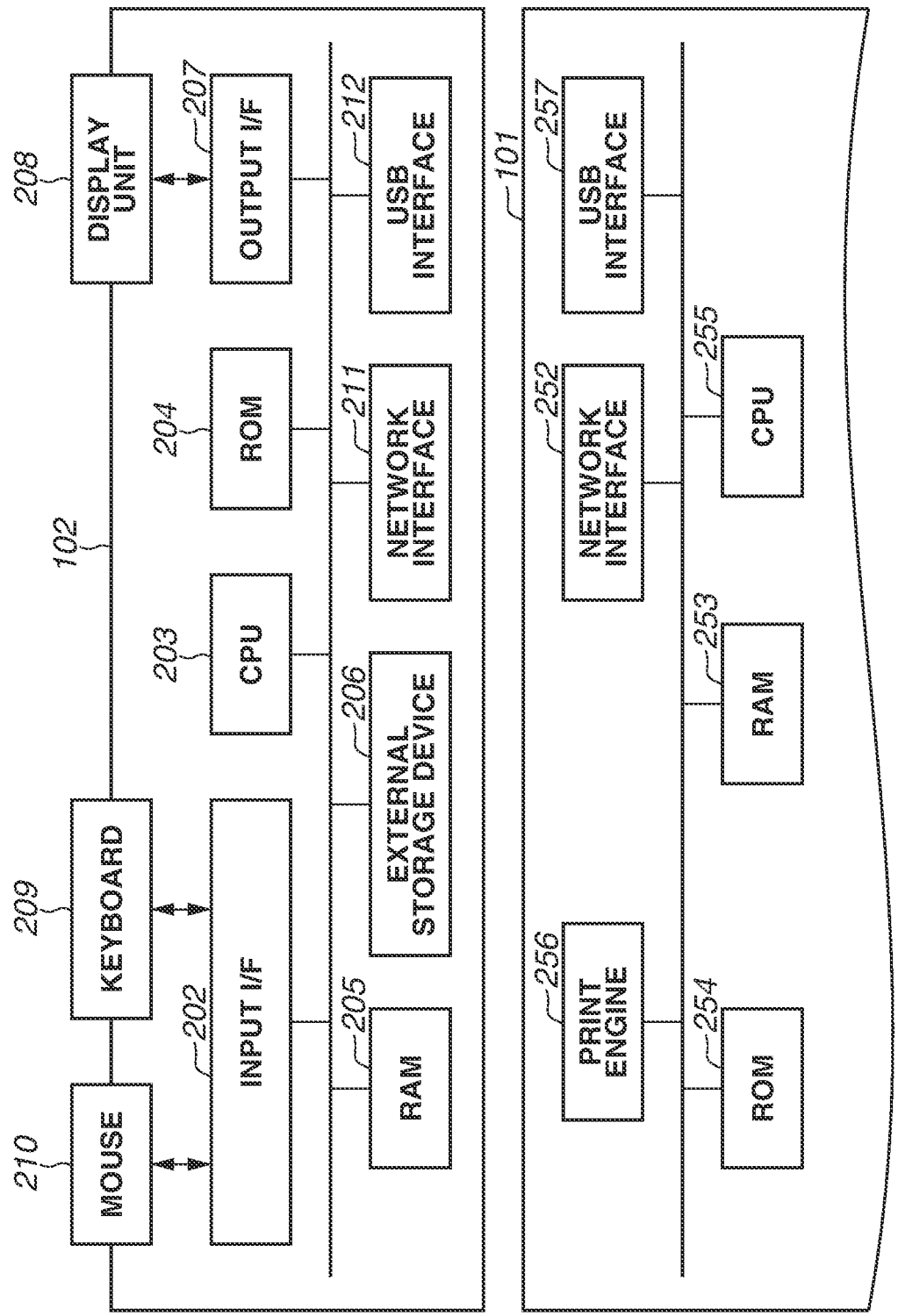
FIG. 2 is a hardware configuration diagram of an information processing apparatus and a communication apparatus in the exemplary embodiment.

FIG. 2 is a hardware configuration diagram of the communication apparatus 101 and the information processing apparatus 102.

The information processing apparatus 102 includes, for example, an input interface (I/F) 202, a central processing unit (CPU) 203, a read-only memory (ROM) 204, a random access memory (RAM) 205, an external storage device 206, an output interface (I/F) 207, a display unit 208, a keyboard 209, and a mouse 210. The CPU 203, the ROM 204, and the RAM 205 constitute a computer of the information processing apparatus 102. Additionally, the information processing apparatus 102 further includes, for example, a network interface (first communication unit) 211 and a Universal Serial Bus (USB) interface (second communication unit) 212.

The input I/F 202 is an interface configured to receive data inputting or operation instructions performed by the user operating the mouse 210 or the keyboard 209.

The CPU 203, which serves a system control unit, is a processor which controls the entire information processing apparatus 102.

The ROM 204 stores fixed data, such as control programs, data tables, and a built-in operating system (OS) program, which the CPU 203 executes. In the present exemplary embodiment, each control program stored in the ROM 204 performs software execution control, such as scheduling, task switching, and interrupt processing, under the control of the built-in OS program stored in the ROM 204.

The RAM 205 is configured with, for example, a static random access memory (SRAM), which needs a backup power source. Furthermore, the RAM 205 is configured to retain data with use of a primary battery for data backup (not illustrated) and is, therefore, able to store important data, such as program control variables, in a non-volatile manner. Moreover, the RAM 205 also has a memory area in which to store, for example, setting information about the information processing apparatus 102 and management data about the information processing apparatus 102. Moreover, the RAM 205 is also used as a main memory and a work memory for the CPU 203.

The external storage device 206 stores, for example, an application for providing a printing execution function and a print job generation program for generating a print job which is interpretable by the communication apparatus 101. Moreover, the external storage device 206 stores various programs, such as an information transmission and reception control program for performing transmission and reception with the communication apparatus 101, which is connected thereto via the network interface 211 or the USB interface 212, and various pieces of information which these programs use. Furthermore, a setup program described below is assumed to be stored in the external storage device 206.

The output IF 207 is an interface used to perform control to cause the display unit 208 to display data or issue a notification of the status of the information processing apparatus 102.

The display unit 208, which is configured with, for example, a light-emitting diode (LED) or a liquid crystal display (LCD), displays data or issues a notification of the status of the information processing apparatus 102. Furthermore, an operation unit including, for example, numerical value entry keys, a mode setting key, a determination key, a cancel key, and a power key can be mounted on the display unit 208 to receive inputs from the user via the display unit 208.

The network interface 211 controls communication processing which is performed in a wireless manner or communication processing which is performed via a wired LAN cable. Specifically, the network interface 211 is a configuration which connects to the communication apparatus 101 or an external apparatus which is present outside the information processing apparatus 102 and outside the communication apparatus 101 via a wireless or wired LAN and performs data communication with the communication apparatus 101 or the external apparatus. For example, the network interface 211 is able to connect to an access point (not illustrated) located inside the communication apparatus 101. As the network interface 211 and an access point located inside the communication apparatus 101 connect to each other, the information processing apparatus 102 and the communication apparatus 101 become able to communicate with each other. Furthermore, the network interface 211 can be configured to perform communication with the communication apparatus 101 directly by wireless communication or can be configured to perform communication with the communication apparatus 101 via an external apparatus which is present outside the information processing apparatus 102 or the communication apparatus 101. Furthermore, the external apparatus mentioned herein includes an external access point or an apparatus which is capable of relaying communication at other than any access point. While, in the present exemplary embodiment, the standard of IEEE 802.11 Series (Wireless Fidelity (Wi-Fi)) is assumed to be used, for example, Bluetooth® can also be used. Examples of the wireless communication method include Wi-Fi® (Wireless Fidelity) and Bluetooth®. Moreover, examples of the external access point include a router device. Furthermore, in the present exemplary embodiment, the method in which the information processing apparatus 102 and the communication apparatus 101 connect to each other directly without via an external access point is referred to as a "direct connection method". Moreover, the method in which the information processing apparatus 102 and the communication apparatus 101 connect to each other via an external access point is referred to as an "infrastructure connection method". Furthermore, to enable performing communication by a plurality of communication methods, the information processing apparatus 102 can be configured to include a plurality of network interfaces 211. Specifically, the information processing apparatus 102 can be configured to also include an interface used to perform communication by a short-distance wireless communication method, such as Bluetooth Low Energy (BLE), Near Field Communication (NFC), or Wi-Fi Aware. Moreover, the information processing apparatus 102 does not need to include a network interface 211 used to perform wireless communication. In other words, the information processing apparatus 102 can be configured to include, as interfaces used to communicate with another apparatus, for example, only a network interface 211 used to perform wired communication and a USB interface 212 described below.

The USB interface 212 controls a USB connection which is performed via a USB cable. Specifically, the USB interface 212 is a configuration which connects to the communication apparatus 101 or an apparatus, such as an external access point, by a USB cable and then performs data communication therewith.

The communication apparatus 101 includes, for example, a network interface (I/F) (communication unit) 252, a RAM 253, a print engine 256, a ROM 254, a CPU 255, and a USB interface 257. The CPU 255, the RAM 253, and the ROM 254 constitute a computer of the communication apparatus 101.

The network interface 252 controls communication processing which is performed in a wireless manner or communication processing which is performed via a wired LAN cable. Specifically, the network interface 252 includes, as an access point located inside the communication apparatus 101, an access point used to connect to an apparatus, such as the information processing apparatus 102. Furthermore, the access point mentioned herein is able to connect to the network interface 211 of the information processing apparatus 102. Furthermore, the network interface 252 can be configured to perform wireless communication directly with the information processing apparatus 102 or can be configured to perform communication with the information processing apparatus 102 via an external access point. In other words, the network interface 252 can be configured to not only operate as an access point by itself but also operate as a slave device which connects to an external access point. While, in the present exemplary embodiment, the standard of IEEE 802.11 Series (Wi-Fi) is assumed to be used, for example, Bluetooth® can also be used. Moreover, the network interface 252 can be configured to include hardware which functions as an access point or can be configured to operate as an access point by software which causes the network interface 252 to function as an access point. Furthermore, to enable performing communication by a plurality of communication methods, the communication apparatus 101 can be configured to include a plurality of network interfaces 252. Specifically, for example, the communication apparatus 101 can be configured to further include an interface used to perform communication by a short-distance wireless communication method, such as BLE, NFC, or Wi-Fi Aware.

The RAM 253 is configured with, for example, an SRAM, which needs a backup power source. Furthermore, the RAM 253 is configured to retain data with use of a primary battery for data backup (not illustrated) and is, therefore, able to store important data, such as program control variables, in a non-volatile manner. Moreover, the RAM 253 also has a memory area in which to store, for example, setting information about the communication apparatus 101 and management data about the communication apparatus 101. Moreover, the RAM 253 is also used as a main memory and a work memory for the CPU 255, and serves as a receive buffer configured to temporarily store print information or various pieces of information received from, for example, the information processing apparatus 102.

The ROM 254 stores fixed data, such as control programs, data tables, and a built-in operating system (OS) program, which the CPU 255 executes. In the present exemplary embodiment, each control program stored in the ROM 254 performs software execution control, such as scheduling, task switching, and interrupt processing, under the control of the built-in OS program stored in the ROM 254.

The CPU 255, which serves a system control unit, is a processor which controls the entire communication apparatus 101.

The print engine 256 performs image formation processing for forming an image on a recording medium, such as paper, by applying a recording agent, such as ink, onto the recording medium based on information stored in the RAM 253 or a print job received from, for example, the information processing apparatus 102, and outputs a printed result. Furthermore, the print job mentioned herein is a job for causing the communication apparatus 101 to perform image formation processing.

Furthermore, in the present exemplary embodiment, the communication apparatus 101 is assumed to use at least one of frequency bands of 2.4 GHz and 5 GHz for wireless communication based on the standard of IEEE 802.11 Series. The communication apparatus 101 has communication channels corresponding to usable frequency bands. For example, if the frequency band of 2.4 GHz is usable, the communication apparatus 101 has 14 communication channels which are allocated to respective predetermined frequency bands included in the frequency band of 2.4 GHz. Moreover, for example, if the frequency band of 5 GHz is usable, the communication apparatus 101 has 19 communication channels which are allocated to respective predetermined frequency bands included in the frequency band of 5 GHz.

While, in the present exemplary embodiment, sharing of processing operations which the information processing apparatus 102 and the communication apparatus 101 perform is configured as described above as an example, the present exemplary embodiment is not limited to this sharing configuration, but another configuration can be employed.

In the present exemplary embodiment, the information processing apparatus 102 performs processing (network setting processing) for causing the communication apparatus 101 and an AP to connect to each other.

Furthermore, as the method of causing the communication apparatus 101 and an AP to connect to each other, there is a known method for simply establishing a Wi-Fi connection between apparatuses without receiving, from the user, inputting of connection information (specifically, a password) used for connection to an AP. Such a method is referred to as "simple connection processing". Specifically, the simple connection processing is, for example, connection processing that is based on standards, such as AirStation One-Touch Secure System (AOSS), Rakuraku Wireless Start, and Wi-Fi Protected Setup (WPS). Furthermore, in the present exemplary embodiment, connection processing that is based on WPS is assumed to be used as the simple connection processing.

When starting the simple connection processing, an apparatus (AP) which serves as a master device in a connection to be established by the simple connection processing broadcasts a predetermined beacon that is based on a standard for the simple connection processing and is used to issue a notification indicating that the simple connection processing is in progress. The predetermined beacon is a beacon which is receivable by a destination apparatus (the communication apparatus 101) on which the simple connection processing is being performed. In a case where the simple connection processing is connection processing that is based on WPS, a state in which an AP is performing the simple connection processing is referred to as a "WPS mode". On the other hand, when starting the simple connection processing, a destination apparatus (the communication apparatus 101) which serves as a slave device in a connection to be established by the simple connection processing searches for the predetermined beacon, which is issued by an AP which is performing the simple connection processing, to search for the AP which is performing the simple connection processing. In a case where the predetermined beacon has been received by the communication apparatus 101 on which the simple connection processing is being performed, connection setting of the communication apparatus 101 with the AP (for example, transfer of AP information) is performed, so that the AP and the communication apparatus 101 connect to each other by Wi-Fi.

The method for performing the simple connection processing includes, for example, a Push Button Configuration (PBC) method and a Personal Identification Number (PIN) code method. Furthermore, the PBC method is a method of starting simple connection processing by performing a user operation for simple connection processing, such as pressing of a predetermined button, within a predetermined time in each of the communication apparatus 101 and the AP. Moreover, the PIN code method is a method of starting simple connection processing by inputting a PIN code of the AP to the communication apparatus 101. In the present exemplary embodiment, the communication apparatus 101 is able to receive, from the user via a screen displayed by the communication apparatus 101, an input indicating by which of the PBC method and the PIN code method to start simple connection processing, and is able to start simple connection processing by the received method.

However, each of the PBC method and the PIN code method is a method which requires a direct user operation on the communication apparatus 101. Therefore, a configuration which starts simple connection processing by the PBC method or the PIN code method has issues in which, for example, the configuration is burdensome for the user and it is necessary to place both the communication apparatus 101 and the AP to positions at which the user is able to quickly operate the communication apparatus 101 and the AP within a predetermined time.

Therefore, in the present exemplary embodiment, the information processing apparatus 102 transmits an execution instruction for simple connection processing to the communication apparatus 101, thus causing the communication apparatus 101 to start simple connection processing, without a user operation on the communication apparatus 101 being performed. This enables the information processing apparatus 102 to simply cause the communication apparatus 101 and the AP to connect to each other.

On the other hand, not all of the models of APs and communication apparatuses 101 are necessarily compatible with the simple connection processing (able to perform the simple connection processing). In a case where the AP or the communication apparatus 101 is not compatible with the simple connection processing, even when transmitting an execution instruction for simple connection processing to the communication apparatus 101, naturally, the information processing apparatus 102 cannot cause the communication apparatus 101 and the AP to connect to each other.

Therefore, in the present exemplary embodiment, a configuration in which the information processing apparatus 102 checks whether the AP and the communication apparatus 101 are compatible with the simple connection processing is described.

Moreover, the simple connection processing being performed needs not only an execution instruction for simple connection processing being transmitted to the communication apparatus 101 but also a user operation for simple connection processing on the AP being performed. However, the user who is performing network setting processing using the information processing apparatus 102 is unlikely to recognize that the user is required to perform a user operation for simple connection processing on the AP.

Therefore, in the present exemplary embodiment, a configuration in which the information processing apparatus 102 performs notification processing for prompting the user to perform an operation for performing simple connection processing on the AP.

Figure 3:
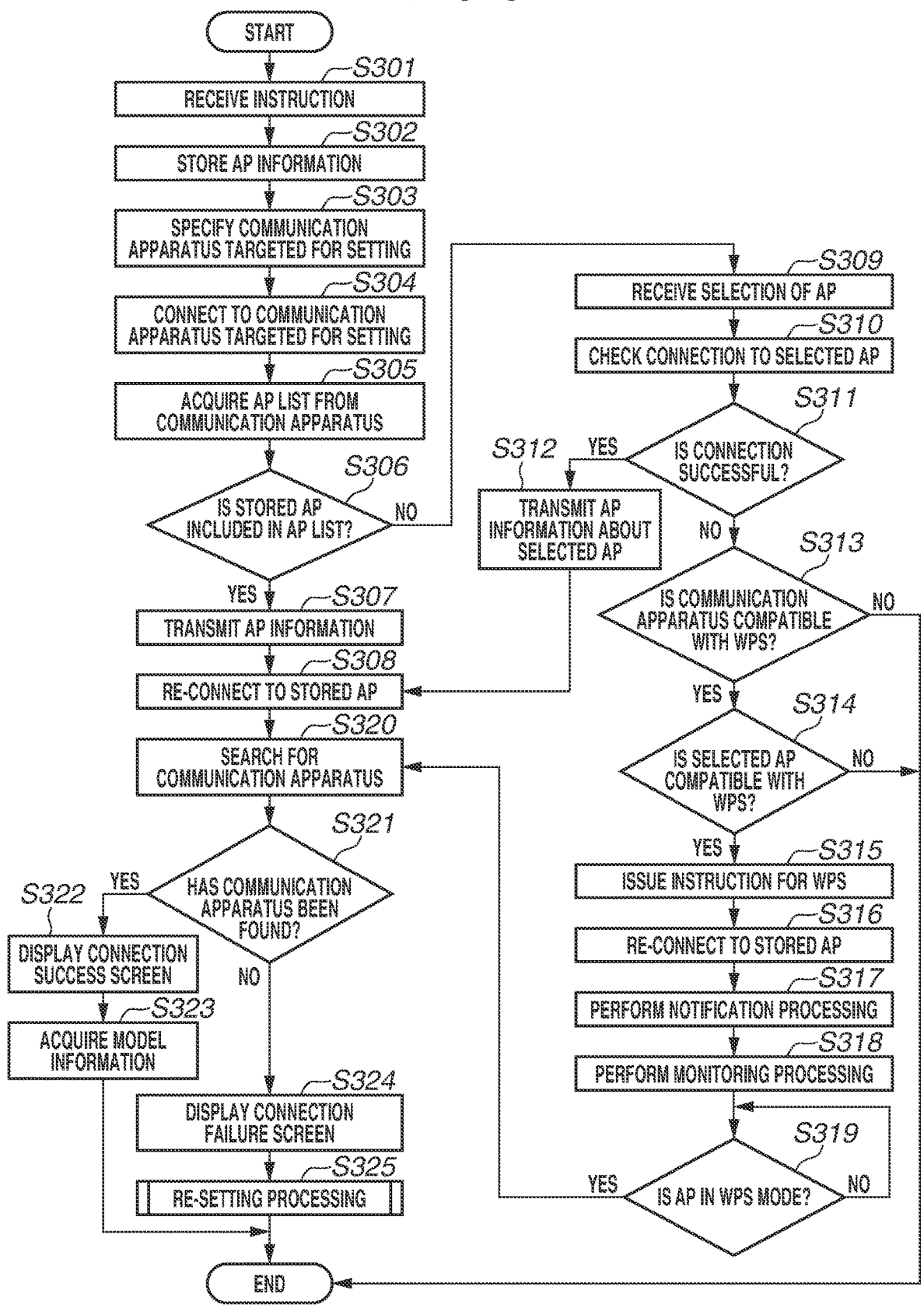
FIG. 3 is a flowchart illustrating network setting processing which the information processing apparatus performs in the exemplary embodiment.

FIG. 3 is a flowchart illustrating network setting processing which the information processing apparatus 102 performs. The flowchart illustrated in FIG. 3 is implemented by, for example, the CPU 203 reading out a program stored in, for example, the ROM 204 or the external storage device 206 onto the RAM 205 and executing the read-out program. Specifically, processing represented by the flowchart illustrated in FIG. 3 is implemented by a setup program which is a program for performing network setting processing. Moreover, the flowchart illustrated in FIG. 3 is started in a case where it has been detected that the information processing apparatus 102 is connected to any AP (here, the AP 103).

In S301, the CPU 203 receive a user operation (an execution instruction for network setting processing), which serves as a trigger for network setting processing, via a screen displayed by the setup program.

In S302, the CPU 203 stores AP information about the AP 103 to which the information processing apparatus 102 is currently connected (in other words, to which the information processing apparatus 102 is connected when the execution instruction for network setting processing is received by the CPU 203). The AP information includes, for example, connection information (for example, a service set identifier (SSID) or a password) used to connect to an AP and information about frequencies usable for connection to an AP.

In S303, the CPU 203 specifies an apparatus which is targeted for network setting processing. Specifically, the CPU 203 acquires information about apparatuses near the information processing apparatus 102 with use of an application programming interface (API) of the OS included in the information processing apparatus 102. More specifically, the CPU 203 acquires information about an apparatus which is searched for by the network interface 211 (in other words, by Wi-Fi) or an apparatus which is connected via the USB interface 212. Then, the CPU 203 displays, on the display unit 208, a list of apparatuses which are connected to the interfaces included in the information processing apparatus 102, with use of the acquired information. The apparatus which is searched for by the network interface 211 includes, for example, an apparatus which is operating as an access point and an apparatus which belongs to a network to which the information processing apparatus 102 belongs. Furthermore, in the present exemplary embodiment, when performing network setting processing on the communication apparatus 101, the user causes the communication apparatus 101 to operate in a predetermined mode called a setup mode. Specifically, the user performs a predetermined operation for causing the communication apparatus 101 to operate in the setup mode on a display unit or a hardware button of the communication apparatus 101, thus causing the communication apparatus 101 to operate in the setup mode. Furthermore, the communication apparatus 101 can be configured to operate in the setup mode based on the communication apparatus 101 being powered on by the user for the first time in a state in which initial setting of the communication apparatus 101 is not yet completed (in a state of arrival of shipment). The setup mode mentioned herein is a mode in which the communication apparatus 101 is able to receive network setting processing and the communication apparatus 101 operates as a predetermined access point having a predetermined SSID. In a case where the communication apparatus 101 is operating in the setup mode, since the communication apparatus 101 is found by searching performed by the network interface 211, the communication apparatus 101 is displayed in the list. Furthermore, the information processing apparatus 102 may in some cases not include the network interface 211 for wireless communication or the network interface 211 for wired communication may in some cases not be connected to any apparatus. In those cases, only an apparatus which is connected to the USB interface 212 is displayed in the list. In response to the user selecting the communication apparatus 101 in the displayed list, the CPU 203 specifies the communication apparatus 101 as an apparatus targeted for network setting processing. Furthermore, in the list displayed here, an apparatus found by Wi-Fi and an apparatus found by USB can be displayed in a distinguishable manner.

In S304, the CPU 203 causes the communication apparatus 101 specified as an apparatus targeted for network setting processing and the information processing apparatus 102 to connect to each other. At this time, for example, in a case where the apparatus specified as an apparatus targeted for network setting processing is a communication apparatus 101 which is operating in the setup mode, the information processing apparatus 102 directly connects to the communication apparatus 101 by Wi-Fi. Therefore, in a case where the information processing apparatus 102 and the AP 103 have been connected to each other, the CPU 203 temporarily interrupts such a connection and then causes the information processing apparatus 102 to directly connect to the communication apparatus 101 by Wi-Fi.

In S305, the CPU 203 acquires, from the communication apparatus 101 via direct connection, a list of APs to which the communication apparatus 101 is able to connect. The list to be acquired is a list of APs which the communication apparatus 101 has found by searching using Wi-Fi before transitioning to the setup mode, and includes AP information (for example, SSIDs) about the found APs. Furthermore, the AP information mentioned here does not include any password. Moreover, at this time, the CPU 203 also acquires, from the communication apparatus 101, for example, frequency band information about frequency bands which the communication apparatus 101 is able to use and setting information indicating whether the communication apparatus 101 is compatible with the simple connection processing.

In S306, the CPU 203 determines whether an AP to which the information processing apparatus 102 has been connected when receiving the execution instruction for network setting processing (here, the AP 103) is included in the list acquired in S305, based on the AP information stored in S302. As mentioned above, the list acquired in S305 is a list of access points to which the communication apparatus 101 is able to connect. Therefore, such a determination can be regarded as a determination of whether an AP to which the information processing apparatus 102 has been connected when receiving the execution instruction for network setting processing and the communication apparatus 101 are able to connect to each other. For example, in a case where the AP 103 is not included in the list acquired in S305, the AP 103 and the communication apparatus 101 are not able to connect to each other, and, in a case where the AP 103 is included in the list acquired in S305, the AP 103 and the communication apparatus 101 are able to connect to each other. Furthermore, the case where an AP to which the information processing apparatus 102 has been connected when receiving the execution instruction for network setting processing is not included in the list acquired in S305 includes the following cases. The first case is, for example, a case where the communication apparatus 101 is not compatible with a predetermined frequency band of, for example, 5 GHz and the AP to which the information processing apparatus 102 has been connected when receiving the execution instruction for network setting processing is an AP which uses the predetermined frequency band. Moreover, the second case is, for example, a case where the AP to which the information processing apparatus 102 has been connected when receiving the execution instruction for network setting processing is operating in a stealth mode and, therefore, has not been found by searching using Wi-Fi. If the result of the determination is YES (YES in S306), the CPU 203 advances the processing to S307, and, if the result of the determination is NO (NO in S306), the CPU 203 advances the processing to S309.

After the result of the determination in S306 being YES, then in S307, the CPU 203 transmits the AP information stored in S302 to the communication apparatus 101 via a direct connection between the communication apparatus 101 and the information processing apparatus 102.

In S308, the CPU 203 cancels a direct connection between the communication apparatus 101 and the information processing apparatus 102. Then, the CPU 203 re-establishes a connection between the AP 103, to which the information processing apparatus 102 has been connected when receiving the execution instruction for network setting processing, and the information processing apparatus 102 based on the AP information stored in S303. Furthermore, the CPU 203 is assumed to have transmitted, to the communication apparatus 101 in S312 described below, AP information about an AP other than the AP 103, to which the information processing apparatus 102 has been connected when receiving the execution instruction for network setting processing. In that case, the CPU 203 can use the AP information transmitted to the communication apparatus 101 and establish a connection between an AP corresponding to the transmitted AP information and the information processing apparatus 102. After that, the CPU 203 advances the processing to S320.

Figure 8A:
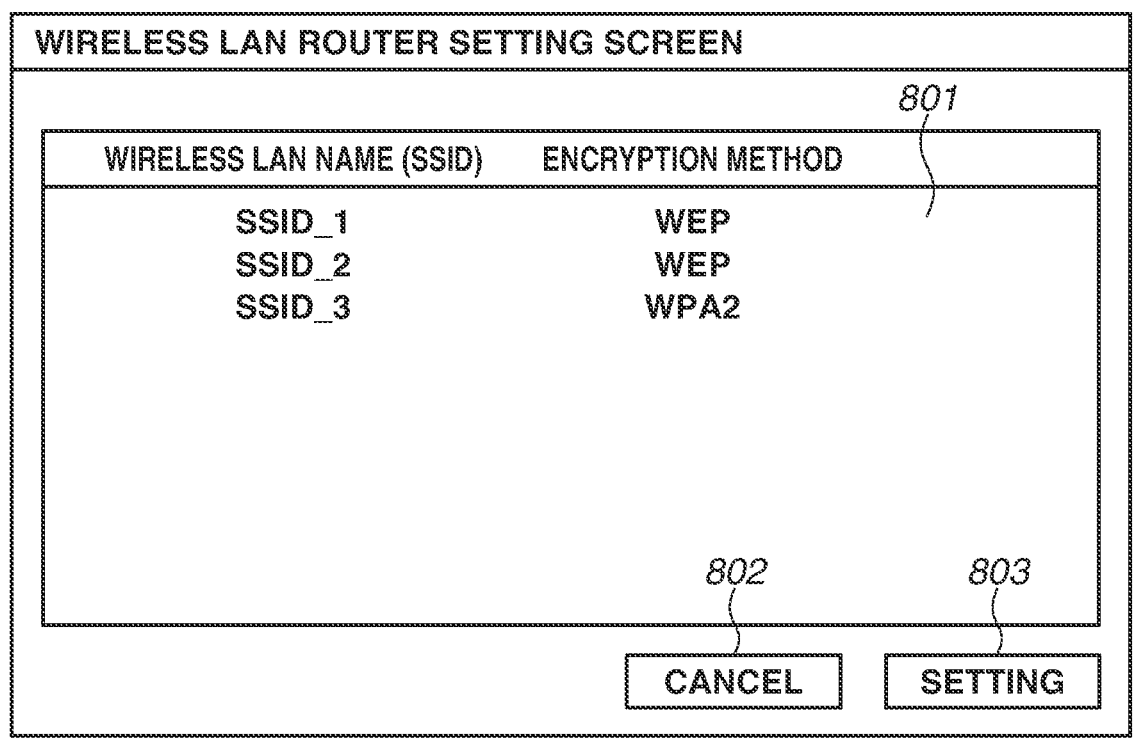
FIGS. 8A and 8B are diagrams illustrating an access point (AP) selection screen and a password entry screen, respectively, in the exemplary embodiment.
Figure 8B:
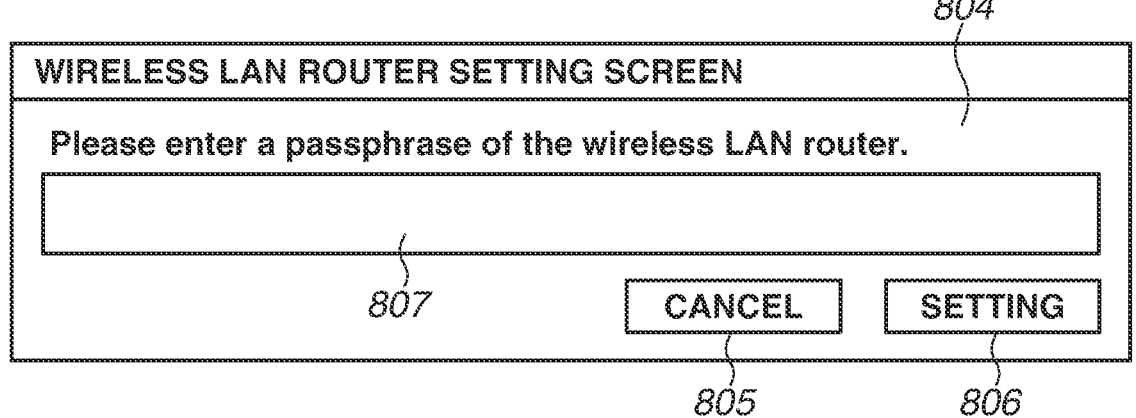

On the other hand, after the result of the determination in S306 being NO, then in S309, the CPU 203 receives selection of an AP which is caused to connect to the communication apparatus 101. Specifically, the CPU 203 displays, on the display unit 208, an AP selection screen 801 (FIG. 8A) including the list acquired in S305, and receives selection of any AP included in the list from the user. In the AP selection screen, SSIDs and encryption methods of the respective APs included in the list acquired in S305 are displayed. Furthermore, the present exemplary embodiment is not limited to this configuration, and, for example, information about frequency bands which APs included in the list acquired in S305 use for wireless connection can be displayed. The CPU 203 allows the user to select any AP from the list and specifies the selected AP as an AP serving as a connection destination for the communication apparatus 101. Furthermore, at this time, the CPU 203 also displays a cancel button 802 used to cancel network setting processing, together with the list. The CPU 203 ends the processing when the cancel button 802 has been selected. On the other hand, when a setting button 803 has been selected, the CPU 203 displays, on the display unit 208, a password (passphrase) entry screen 804, such as that illustrated in FIG. 8B. The CPU 203 receives, from the user, entry of a password used to connect to the selected AP into an entry field 807. Furthermore, the list which is displayed at this time can be not a list of APs found by searching performed by the communication apparatus 101 but a list of APs found by searching performed by the information processing apparatus 102.

Figure 9:
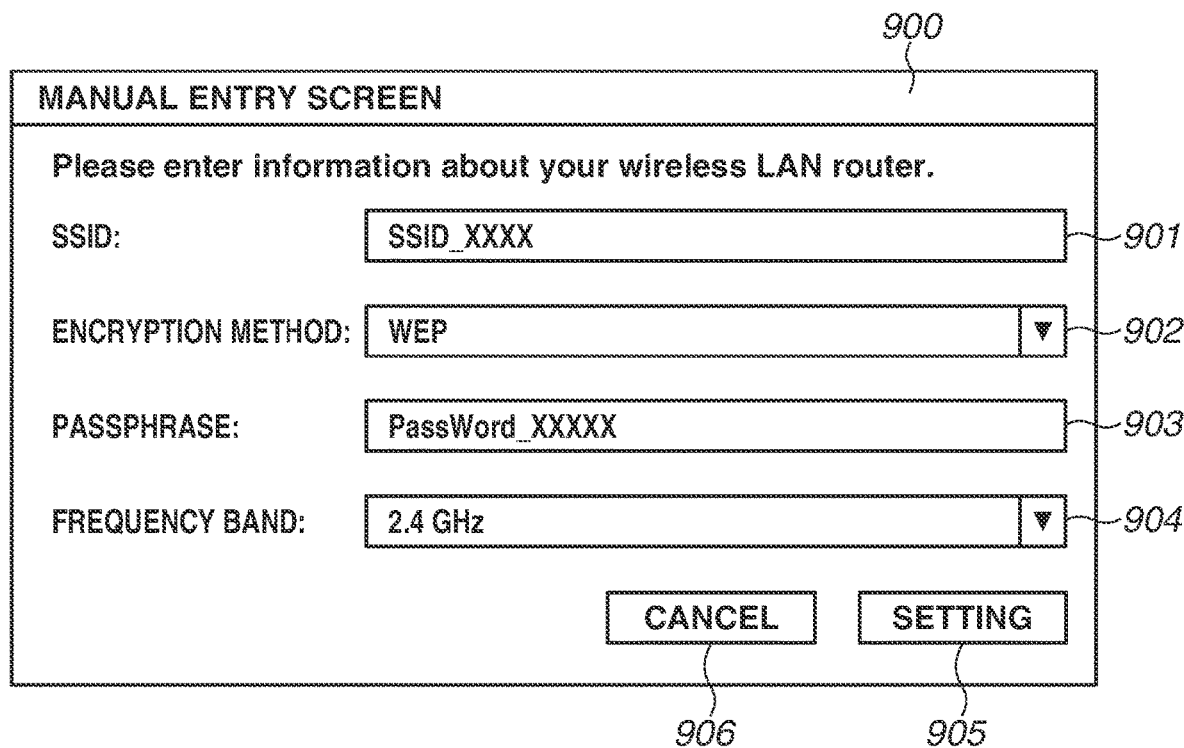
FIG. 9 is a diagram illustrating a manual entry screen in the exemplary embodiment.

Furthermore, in S309, the CPU 203 does not need to allow the user to select an AP from the list acquired in S305. Specifically, for example, the CPU 203 can display, on the display unit 208, a manual entry screen 900 (FIG. 9) used to select an AP by the user manually entering information about an AP, and can receive, from the user, selection of any AP from the manual entry screen 900. Entry fields 901 to 904 are fields used to receive, from the user, entry of information (for example, an SSID, an encryption method, a password, and frequency band information) about an AP which is caused to connect to the communication apparatus 101. An AP that is based on information entered via the manual entry screen 900 is specified as an AP serving as a connection destination for the communication apparatus 101. Furthermore, a configuration in which the manual entry screen 900 is displayed when a particular button (not illustrated) included in the AP selection screen 801 has been pressed can also be employed.

Then, in S310, the CPU 203 checks whether a Wi-Fi connection is able to be performed between the AP selected in S309 and the information processing apparatus 102 (performs connection checking processing). Specifically, first, the CPU 203 temporarily cancels a direct connection between the communication apparatus 101 and the information processing apparatus 102. Then, the CPU 203 performs processing for causing the AP selected in S309 and the information processing apparatus 102 to connect to each other by Wi-Fi with use of information (for example, an SSID and a password) entered in S309. If the information entered in S309 is correct, a Wi-Fi connection between the AP selected in S309 and the information processing apparatus 102 is successful, and, if the information entered in S309 is incorrect, a Wi-Fi connection between the AP selected in S309 and the information processing apparatus 102 is failed. After identifying the success or failure of a connection between the AP selected in S309 and the information processing apparatus 102, the CPU 203 re-establishes a direct connection between the communication apparatus 101 and the information processing apparatus 102.

Furthermore, in a case where, in S309, an AP has been selected via the manual entry screen 900, the frequency band which the AP selected in S309 uses may not correspond to the frequency band which the communication apparatus 101 is able to use. Therefore, in a case where an AP has been selected via the manual entry screen 900, in S310, the CPU 203 can determine whether the frequency band which the AP selected in S309 uses corresponds to the frequency band which the communication apparatus 101 is able to use, based on the frequency band information acquired in S305. Then, if the result of such a determination is YES, the CPU 203 can perform connection checking processing and perform subsequent-stage processing based on a result of the connection checking processing. Moreover, if the result of such a determination is NO, the CPU 203 can determine that a connection between the AP selected in S309 and the information processing apparatus 102 is failed and perform subsequent-stage processing.

In S311, the CPU 203 determines whether a connection between the AP selected in S309 and the information processing apparatus 102 is successful. If the result of the determination is YES (YES in S311), the CPU 203 advances the processing to S312, and, if the result of the determination is NO (NO in S311), the CPU 203 advances the processing to S313.

After the result of the determination in S311 being YES, then in S312, the CPU 203 transmits AP information (for example, an SSID and a password) about the AP selected in S309 to the communication apparatus 101 via a direct connection between the communication apparatus 101 and the information processing apparatus 102. Then, the CPU 203 advances the processing to S308.

On the other hand, after the result of the determination in S311 being NO, then in S313, the CPU 203 determines whether the communication apparatus 101 is compatible with the simple connection processing, based on the setting information acquired in S305. If the result of the determination is YES (YES in S313), the CPU 203 advances the processing to S314, and, if the result of the determination is NO (NO in S313), since it is impossible to cause the communication apparatus 101 and the AP to connect to each other, the CPU 203 ends the processing.

In S314, the CPU 203 determines whether the AP selected in S309 is compatible with the simple connection processing. Specifically, first, the CPU 203 makes an inquiry (transmits a probe request) to the AP selected in S309 while specifying an SSID of the AP selected in S309. Then, the CPU 203 receives a probe response, which is a response to the probe request, from the AP. The probe response includes information indicating compatibility with simple connection processing, such as WPS. Then, the CPU 203 performs the above-mentioned determination based on the acquired information. Furthermore, the reason why the present determination is performed is that not all of the models of APs are necessarily compatible with the simple connection processing. Moreover, there is a model of AP which is capable of setting enablement and disablement of the function of simple connection processing. The reason why the present determination is performed is that, in a case where the function of simple connection processing is set disabled in such an AP, even when receiving an operation for performing simple connection processing from the user, the AP is not able to perform the simple connection processing. If the result of the determination is YES (YES in S314), the CPU 203 advances the processing to S315, and, if the result of the determination is NO (NO in S314), since it is impossible to cause the communication apparatus 101 and the AP to connect to each other, the CPU 203 ends the processing.

In S315, the CPU 203 transmits an execution instruction for causing the communication apparatus 101 to perform simple connection processing (an execution instruction for simple connection processing) to the communication apparatus 101 via a direct connection between the communication apparatus 101 and the information processing apparatus 102.

In S316, the CPU 203 cancels a direct connection between the communication apparatus 101 and the information processing apparatus 102. Then, the CPU 203 re-establishes a connection between the AP 103 to which the information processing apparatus 102 has been connected when receiving the execution instruction for network setting processing and the information processing apparatus 102, based on the AP information stored in S302. Furthermore, at this time, the CPU 203 can also establish a connection between the AP selected in S309 and the information processing apparatus 102.

Figure 6:
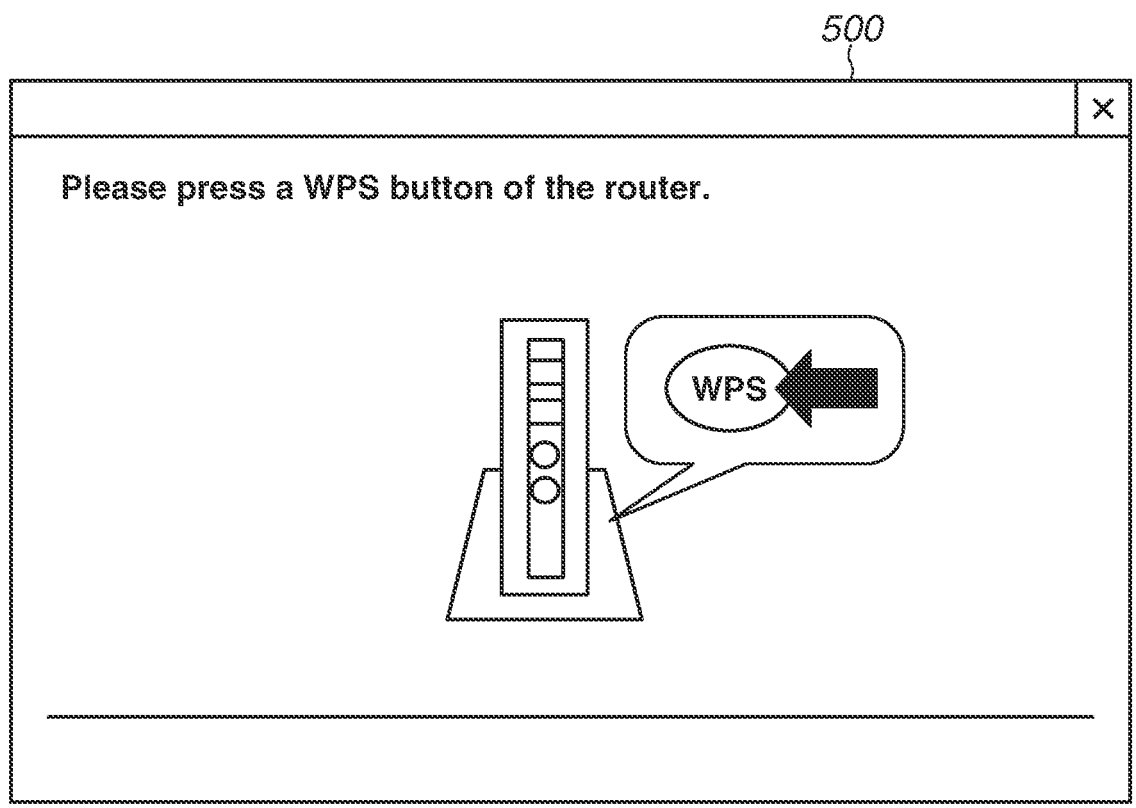
FIG. 6 is a diagram illustrating a notification screen in the exemplary embodiment.

In S317, the CPU 203 performs notification processing for prompting the user to perform an operation for performing simple connection processing (for example, pressing of a WPS button included in the AP) on the AP selected in S309. Specifically, the CPU 203 displays, as notification processing, a notification screen 500, such as that illustrated in FIG. 6, on the display unit 208. Furthermore, for example, identification information (for example, an SSID) about the AP selected in S309 can be displayed in the notification screen. Moreover, for example, a region for describing details of an operation for performing simple connection processing and a button used to newly display the region can be included in the notification screen. In a case where the button has been pressed, for example, the region is displayed as Internet content by, for example, a web browser. This is because, since the information processing apparatus 102 has re-established a connection to the AP in S316, it has become possible to perform communication using the Internet.

In S318, the CPU 203 starts processing for monitoring whether the AP selected in S309 is performing simple connection processing. Specifically, the CPU 203 starts transmitting a probe request to the AP selected in S309. Then, the CPU 203 receives a probe response, which is a response to the probe request, from the AP.

In S319, the CPU 203 determines whether the AP selected in S309 is performing simple connection processing, based on information included in the probe response. Furthermore, the probe response includes information indicating whether the AP is in a state of being performing simple connection processing and being broadcasting a predetermined beacon (for example, a state of being operating in the WPS mode). Since, in S315, the CPU 203 has transmitted the execution instruction for simple connection processing to the communication apparatus 101, if the result of the determination is YES, simple connection processing is performed between the communication apparatus 101 and the AP selected in S309. Then, a connection by Wi-Fi is established between the communication apparatus 101 and the AP selected in S309. If the result of the determination is YES (YES in S319), the CPU 203 advances the processing to S320, and, if the result of the determination is NO (NO in S319), the CPU 203 repeats the processing until the result of the determination becomes YES.

In S320, the CPU 203 performs, for a predetermined time, processing for searching for a communication apparatus 101 via a connection using Wi-Fi between the AP to which the information processing apparatus 102 is currently connected (here, the AP 103) and the information processing apparatus 102. If the communication apparatus 101 is also connected to the AP 103 based on the AP information transmitted in S307 or S312, the communication apparatus 101 is found by searching performed in S320. Moreover, there is a case where the AP 103 is compatible with two frequency bands (for example, 2.4 GHz and 5 GHz) and both the AP selected in S309 and the AP to which the information processing apparatus 102 has re-connected are the AP 103. In other words, there is a case where the information processing apparatus 102 and the communication apparatus 101 are connected to the same AP with use of the respective different frequency bands. In this case, the communication apparatus 101 is also found by searching performed in S320. Moreover, there is a case where, for example, while the AP selected in S309 and the AP 103 are different from each other, both APs are connected to each other, so that the information processing apparatus 102 and the communication apparatus 101 are connected to each other via two APs. In this case, the communication apparatus 101 is also found by searching performed in S320. On the other hand, for example, in a case where, while the AP selected in S309 and the AP 103 are different from each other, both APs are not connected to each other, or in a case where, while the AP selected in S309 and the AP 103 are the same, the AP 103 has an enabled privacy separator function, the communication apparatus 101 is not found.

In S321, the CPU 203 determines whether the communication apparatus 101 has been found by searching performed in S320. Furthermore, the result of the determination being YES indicates that the establishment of an infrastructure connection between the information processing apparatus 102 and the communication apparatus 101 is successful, and the result of the determination being NO indicates that the establishment of an infrastructure connection between the information processing apparatus 102 and the communication apparatus 101 is failed. If the result of the determination is YES (YES in S321), the CPU 203 advances the processing to S322, and, if the result of the determination is NO (NO in S321), the CPU 203 advances the processing to S324.

Figure 7A:
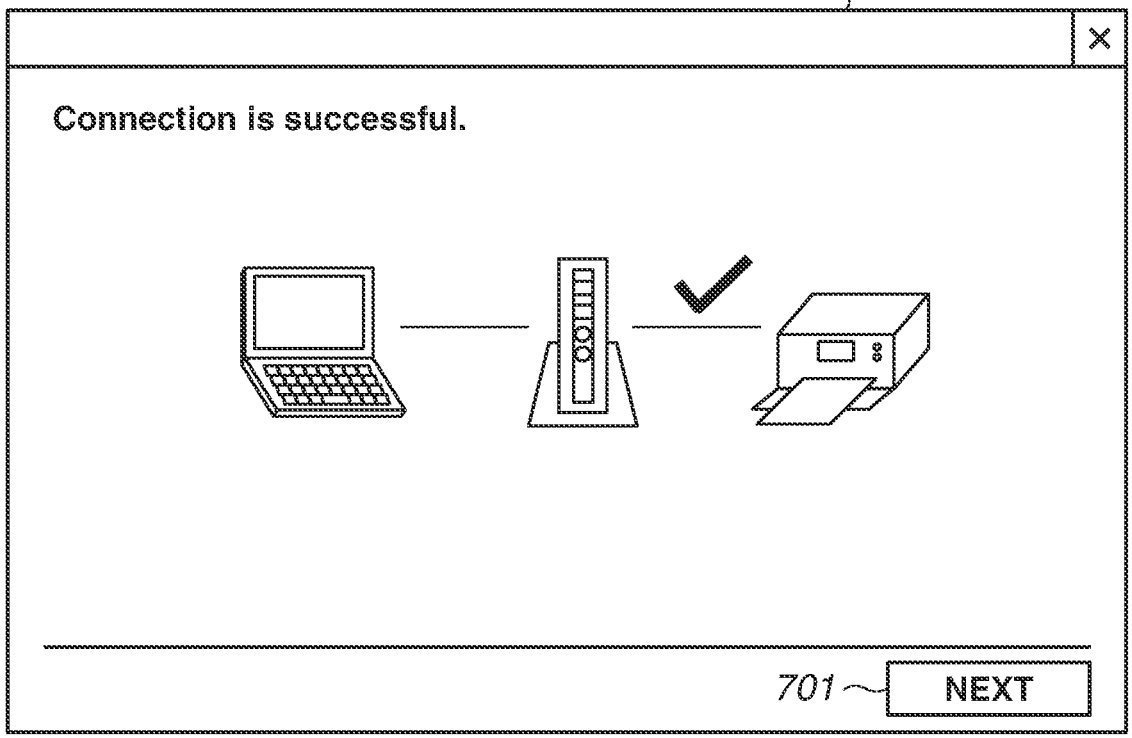
FIGS. 7A and 7B are diagrams illustrating a connection success screen and a connection failure screen, respectively, in the exemplary embodiment.

After the result of the determination in S321 being YES, then in S322, the CPU 203 displays a connection success screen 700, which indicates that the establishment of an infrastructure connection between the information processing apparatus 102 and the communication apparatus 101 is successful, such as that illustrated in FIG. 7A.

In S323, the CPU 203 acquires information about the model of the communication apparatus 101 from the found communication apparatus 101. Then, the CPU 203 performs processing for installing a printer driver corresponding to the communication apparatus 101 on the information processing apparatus 102 based on the acquired information. After that, the CPU 203 ends the processing.

Figure 7B:
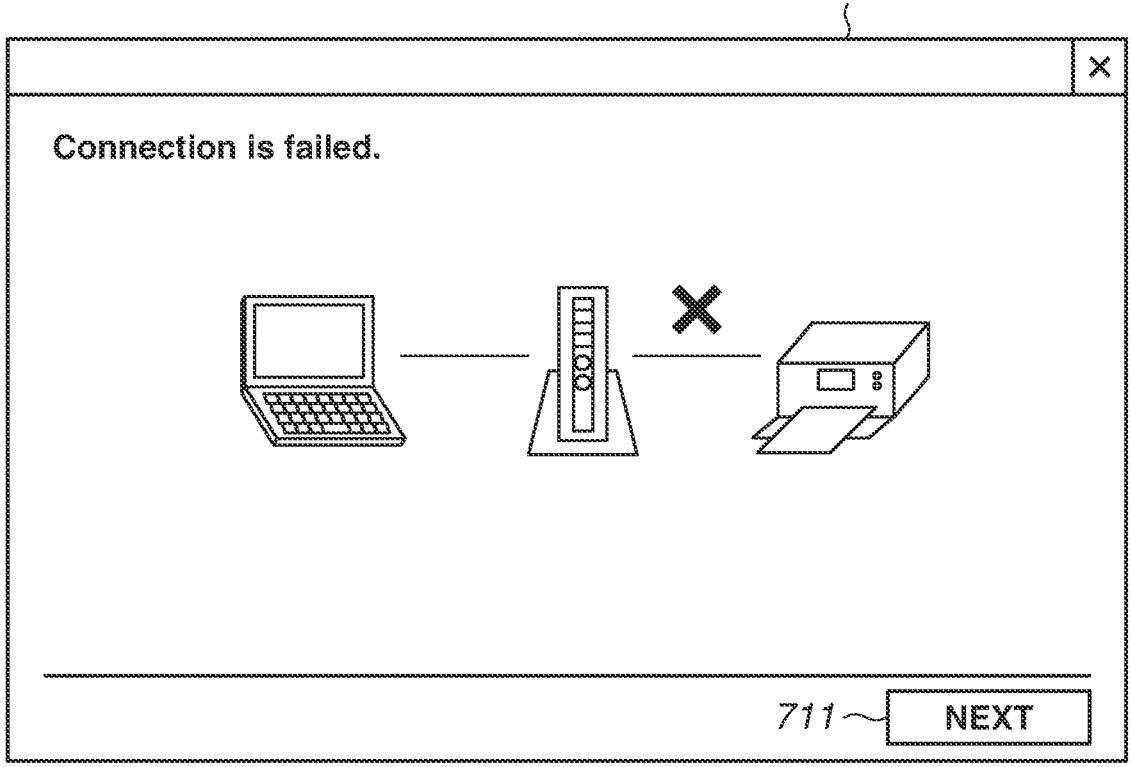

On the other hand, after the result of the determination in S321 being NO, then in S324, the CPU 203 displays a connection failure screen 710, which indicates that the establishment of an infrastructure connection between the information processing apparatus 102 and the communication apparatus 101 is failed, such as that illustrated in FIG. 7B. The connection failure screen 710 can contain, for example, a region which indicates a method of identifying the cause the establishment of such an infrastructure connection has been failed or a method of making the establishment of such an infrastructure connection successful and a button used to newly display such a region.

In S325, the CPU 203 performs network re-setting processing described below. After that, the CPU 203 ends the processing.

Figure 4:
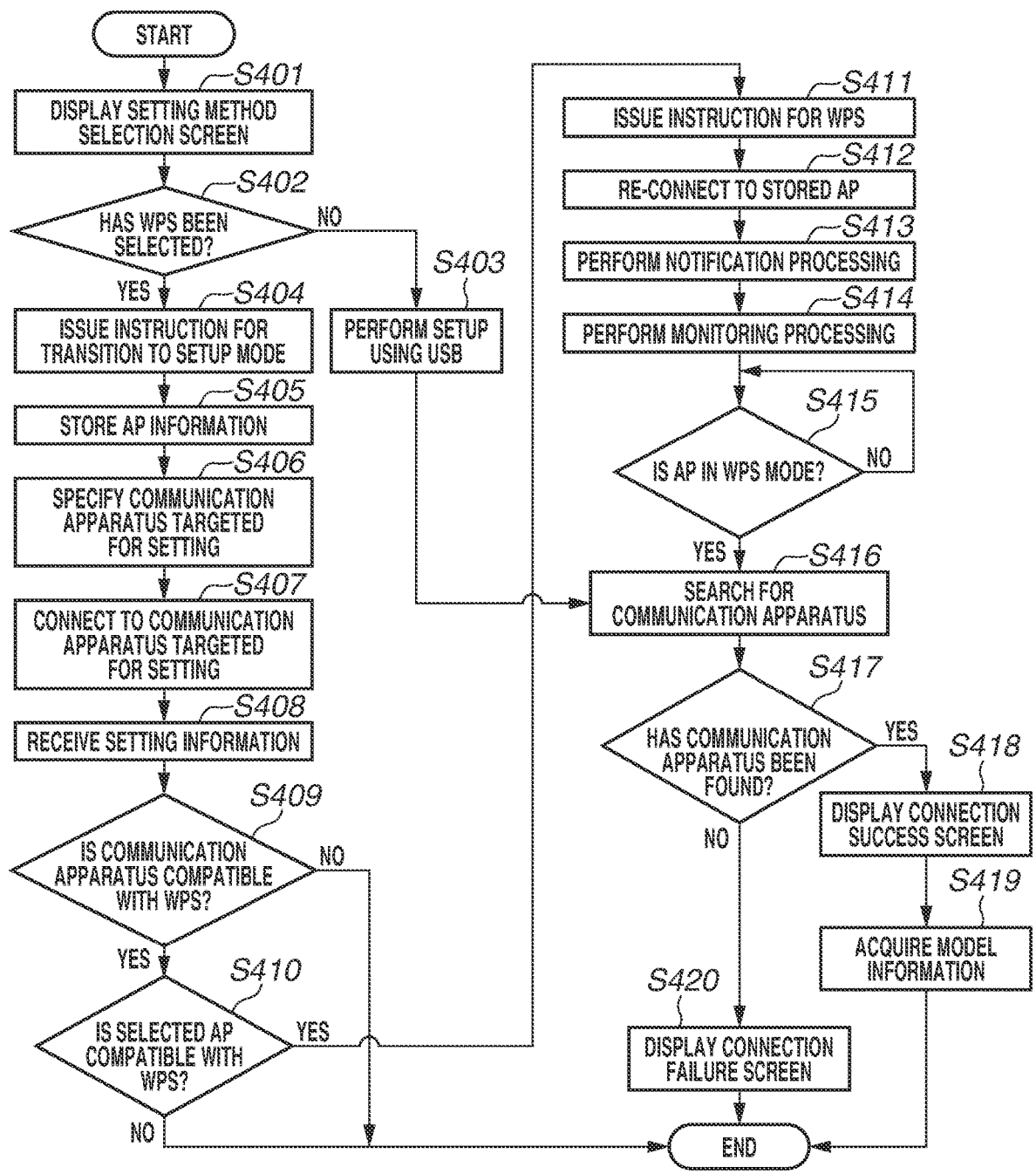
FIG. 4 is a flowchart illustrating network re-setting processing which the information processing apparatus performs in the exemplary embodiment.

FIG. 4 is a flowchart illustrating network re-setting processing (S325) which the information processing apparatus 102 performs. The flowchart illustrated in FIG. 4 is implemented by, for example, the CPU 203 reading out a program stored in, for example, the ROM 204 or the external storage device 206 onto the RAM 205 and executing the read-out program.

First, in S401, the CPU 203 receives, from the user, selection of a setting method which the user uses in the network re-setting processing. Specifically, for example, the CPU 203 displays a screen used to receive, from the user, selection of any one of a method for setting using a USB cable and a method of setting using the simple connection processing, and receives selection via the displayed screen.

In S402, the CPU 203 determines whether the method for setting using the simple connection processing has been selected in S401. If the result of the determination is YES (YES in S402), the CPU 203 advances the processing to S404, and, if the result of the determination is NO (NO in S402), the CPU 203 advances the processing to S403.

After the result of the determination in S402 being NO, then in S403, the CPU 203 transmits AP information to the communication apparatus 101 with use of a USB cable. The AP information to be transmitted at this time can be AP information related to an AP to which the communication apparatus 101 is connected, or can be AP information related to any AP included in the AP list acquired from the communication apparatus 101. After that, the CPU 203 performs processing in S416.

On the other hand, after the result of the determination in S402 being YES, then in S404, the CPU 203 displays, on the display unit 208, a screen used to prompt the user to cause the communication apparatus 101 to transition to the setup mode.

In S405, the CPU 203 stores AP information about an AP (here, the AP 103) to which the information processing apparatus 102 is currently connected. The present processing is similar to the processing in S302.

In S406, the CPU 203 specifies an apparatus which is targeted for network setting processing. The present processing is similar to the processing in S303.

In S407, the CPU 203 causes the communication apparatus 101 specified as an apparatus targeted for network setting processing and the information processing apparatus 102 to connect to each other. The present processing is similar to the processing in S304.

In S408, the CPU 203 acquires, from the communication apparatus 101, frequency band information about a frequency band which the communication apparatus 101 is able to use and setting information indicating whether the communication apparatus 101 is compatible with the simple connection processing.

In S409, the CPU 203 determines whether the communication apparatus 101 is compatible with the simple connection processing, based on the setting information acquired in S408. If the result of the determination is YES (YES in S409), the CPU 203 advances the processing to S410, and, if the result of the determination is NO (NO in S409), since it is impossible to cause the communication apparatus 101 and the AP to connect to each other, the CPU 203 ends the processing.

In S410, the CPU 203 determines whether the AP 103 corresponding to the AP information stored in S405 is compatible with the simple connection processing. The present processing is similar to the processing in S314. Furthermore, for example, in a case where another AP having an SSID with the same name as that of the SSID of the AP 103 is present, the CPU 203 also receives a probe response from such another AP. In this case, the CPU 203 specifies a probe response including the basic service set identifier (BSSID) of the AP 103 from among a plurality of received probe responses. Then, the CPU 203 performs the present determination based on the specified probe response. If the result of the determination is YES (YES in S410), the CPU 203 advances the processing to S411, and, if the result of the determination is NO (NO in S410), since it is impossible to cause the communication apparatus 101 and the AP to connect to each other, the CPU 203 ends the processing.

In S411, the CPU 203 transmits an execution instruction for simple connection processing to the communication apparatus 101 via a direct connection between the communication apparatus 101 and the information processing apparatus 102.

In S412, the CPU 203 cancels a direct connection between the communication apparatus 101 and the information processing apparatus 102. Then, the CPU 203 re-establishes a connection between the AP 103 and the information processing apparatus 102 based on the AP information stored in S405.

In S413, the CPU 203 performs notification processing for prompting the user to perform an operation for performing simple connection processing on the AP 103. The present processing is similar to the processing in S317.

In S414, the CPU 203 starts processing for monitoring whether the AP 103 is performing simple connection processing. The present processing is similar to the processing in S318.

In S415, the CPU 203 determines whether the AP 103 is performing simple connection processing, based on information included in the probe response. The present processing is similar to the processing in S319. If the result of the determination is YES (YES in S415), the CPU 203 advances the processing to S416, and, if the result of the determination is NO (NO in S415), the CPU 203 repeats the processing until the result of the determination becomes YES.

In S416, the CPU 203 performs, for a predetermined time, processing for searching for a communication apparatus 101 via a connection using Wi-Fi between the AP 103 and the information processing apparatus 102. The present processing is similar to the processing in S320.

In S417, the CPU 203 determines whether the communication apparatus 101 has been found by searching performed in S416. The present processing is similar to the processing in S321. If the result of the determination is YES (YES in S417), the CPU 203 advances the processing to S418, and, if the result of the determination is NO (NO in S417), the CPU 203 advances the processing to S420.

After the result of the determination in S417 being YES, then in S418, the CPU 203 displays a connection success screen 700, which indicates that the establishment of an infrastructure connection between the information processing apparatus 102 and the communication apparatus 101 is successful, such as that illustrated in FIG. 7A.

In S419, the CPU 203 acquires information about the model of the communication apparatus 101 from the found communication apparatus 101. Then, the CPU 203 performs processing for installing a printer driver corresponding to the communication apparatus 101 on the information processing apparatus 102 based on the acquired information. After that, the CPU 203 ends the processing.

On the other hand, after the result of the determination in S417 being NO, then in S420, the CPU 203 displays a connection failure screen 710, which indicates that the establishment of an infrastructure connection between the information processing apparatus 102 and the communication apparatus 101 is failed, such as that illustrated in FIG. 7B. The present processing is similar to the processing in S324. After that, the CPU 203 ends the processing. Furthermore, after displaying the connection failure screen 710, the CPU 203 can perform network setting processing again starting with S301 or S401.

In this way, for example, in a case where, although the CPU 203 has transmitted an execution instruction for simple connection processing in the network setting processing, the establishment of an infrastructure connection is failed, the CPU 203 re-transmits an execution instruction for simple connection processing in the network re-setting processing. With this, even if the establishment of an infrastructure connection is failed in the network setting processing, the CPU 203 is able to make the establishment of an infrastructure connection successful in the network re-setting processing.

Furthermore, after an infrastructure connection between the information processing apparatus 102 and the communication apparatus 101 is established by the above-described setting processing, the information processing apparatus 102 is able to transmit, for example, a print job generated with use of the printer driver to the communication apparatus 101 via the established infrastructure connection.

Figure 5:
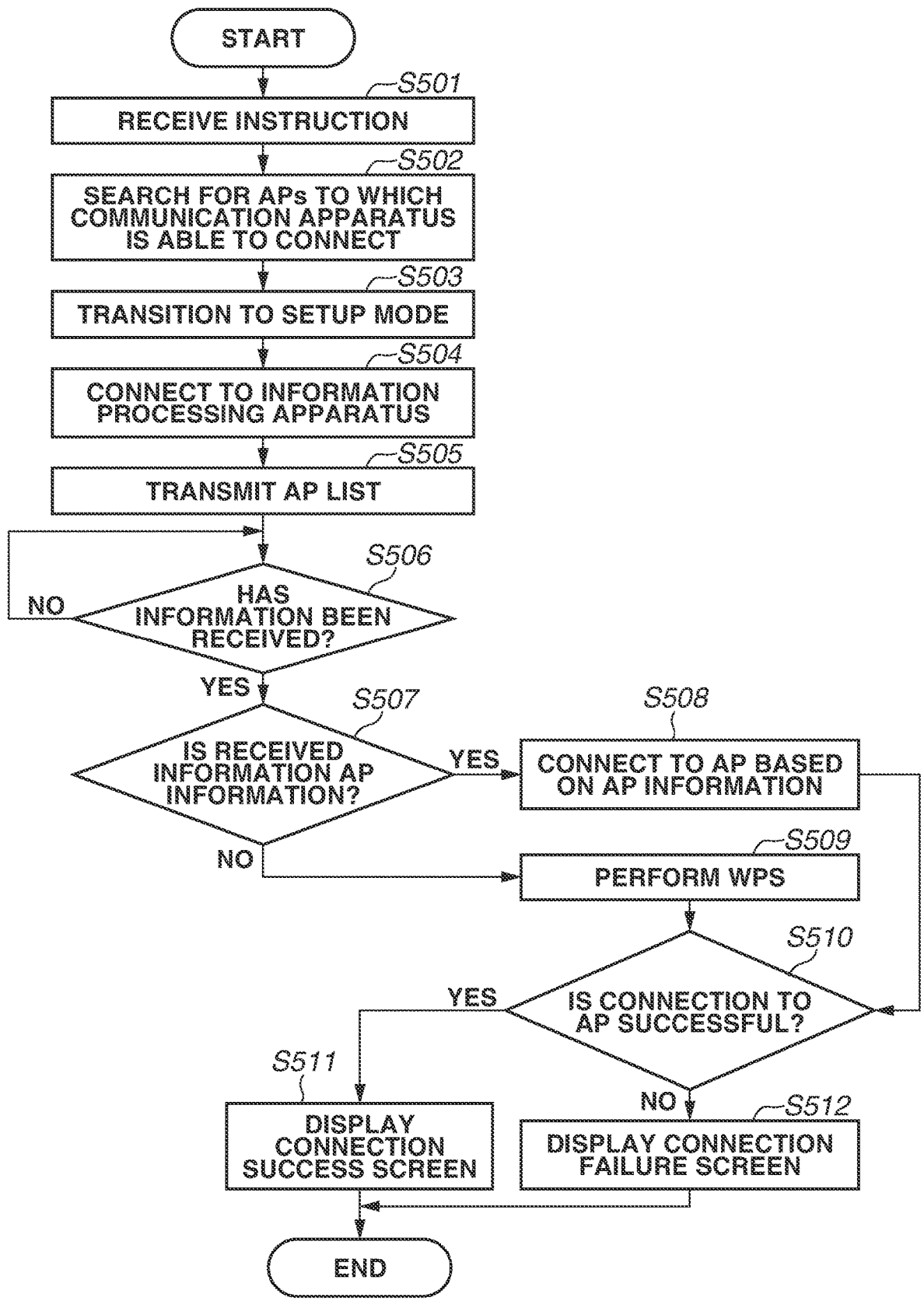
FIG. 5 is a flowchart illustrating network setting processing which the communication apparatus performs in the exemplary embodiment.

FIG. 5 is a flowchart illustrating network setting processing which the communication apparatus 101 performs. The flowchart illustrated in FIG. 5 is implemented by, for example, the CPU 255 reading out a program stored in, for example, the ROM 254 onto the RAM 253 and executing the program.

First, in S501, the CPU 255 receives a user operation serving as a trigger for network setting processing (an execution instruction for network setting processing) via an operation unit (not illustrated) included in the communication apparatus 101. The execution instruction for network setting processing is an operation which is performed on, for example, a display unit or hardware buttons of the communication apparatus 101 to cause the communication apparatus 101 to operate in the setup mode. Moreover, the execution instruction for network setting processing is an operation for powering on the communication apparatus 101 after arrival of shipment of the communication apparatus 101.

In S502, the CPU 255 searches for APs to which the communication apparatus 101 is able to connect by Wi-Fi. The APs to which the communication apparatus 101 is able to connect by Wi-Fi are, in other words, APs which are present near the communication apparatus 101 and use frequency bands which the communication apparatus 101 is able to use.

In S503, the CPU 255 causes the communication apparatus 101 to operate in the setup mode. In other words, the CPU 255 causes the communication apparatus 101 to operate as a predetermined access point having a predetermined SSID.

In S504, the CPU 255 receives a connection request from the information processing apparatus 102 and thus causes the communication apparatus 101 and the information processing apparatus 102 to directly connect to each other by Wi-Fi.

In S505, the CPU 255 transmits, to the information processing apparatus 102 via direct connection, a list of APs to which the communication apparatus 101 is able to connect, which have been found by searching performed in S502.

In S506, the CPU 255 determines whether information has been received from the information processing apparatus 102 via direct connection. If the result of the determination is YES (YES in S506), the CPU 255 advances the processing to S507, and, if the result of the determination is NO (NO in S506), the CPU 255 repeats processing in S506 until information is received.

In S507, the CPU 255 determines whether the information received from the information processing apparatus 102 is AP information. Furthermore, if the information received from the information processing apparatus 102 is not AP information, the information received from the information processing apparatus 102 is an execution instruction for simple connection processing. If the result of the determination is YES (YES in S507), the CPU 255 advances the processing to S508, and, if the result of the determination is NO (NO in S507), the CPU 255 advances the processing to S509.

After the result of the determination in S507 being YES, then in S508, first, the CPU 255 cancels the setup mode and cancels a direct connection between the communication apparatus 101 and the information processing apparatus 102. Then, the CPU 255 causes an AP corresponding to the AP information and the communication apparatus 101 to connect to each other by Wi-Fi based on the AP information received from the information processing apparatus 102.

On the other hand, after the result of the determination in S507 being NO, then in S509, first, the CPU 255 cancels the setup mode and cancels a direct connection between the communication apparatus 101 and the information processing apparatus 102. Then, the CPU 255 performs simple connection processing based on the execution instruction for simple connection processing received from the information processing apparatus 102. Specifically, the CPU 255 searches for a predetermined beacon which an AP that is performing simple connection processing issues, and performs connection processing with the AP that issues the predetermined beacon, thus causing the AP and the communication apparatus 101 to connect to each other by Wi-Fi. Furthermore, at this time, the CPU 255 can perform notification processing which, for example, displays a screen for prompting the user to perform an operation for executing simple connection processing on the AP.

In S510, the CPU 255 determines whether a connection between the AP and the communication apparatus 101 is successful. If the result of the determination is YES (YES in S510), the CPU 255 advances the processing to S511, and, if the result of the determination is NO (NO in S510), the CPU 255 advances the processing to S512.

After the result of the determination in S510 being YES, then in S511, the CPU 255 displays a screen which indicates that a connection between the AP and the communication apparatus 101 is successful.

On the other hand, after the result of the determination in S510 being NO, then in S512, the CPU 255 displays a screen which indicates that a connection between the AP and the communication apparatus 101 is failed.

In this way, in the present exemplary embodiment, in a case where the communication apparatus 101 is not able to connect to an AP based on AP information which the information processing apparatus 102 has transmitted, the information processing apparatus 102 checks whether the communication apparatus 101 and the AP are compatible with simple connection processing. Then, in a case where the information processing apparatus 102 has confirmed that the communication apparatus 101 and the AP are compatible with simple connection processing, the information processing apparatus 102 transmits an execution instruction for simple connection processing to the communication apparatus 101. This enables more reliably and more simply establishing a connection between the communication apparatus 101 and the AP. Additionally, since, without the need for a user operation being directly performed on the communication apparatus 101, the communication apparatus 101 is able to start simple connection processing, user convenience improves.

Moreover, in a case where the communication apparatus 101 is not able to connect to an AP based on AP information which the information processing apparatus 102 has transmitted, the information processing apparatus 102 further performs notification processing which notifies the user to prompt the user to perform an operation for executing simple connection processing on the AP. This enables the user to recognize an operation which the user is to perform when causing simple connection processing to be performed between the communication apparatus 101 and the AP, thus improving user convenience.

While, in the above-described exemplary embodiment, a configuration in which both a communication method used for transmission of AP information and an execution instruction and a communication method used for infrastructure connection are Wi-Fi has been described, the present exemplary embodiment is not limited to this configuration. In other words, for example, the communication method used for transmission of AP information and an execution instruction and the communication method used for infrastructure connection can be different from each other. Specifically, for example, the communication method used for transmission of AP information and an execution instruction can be Bluetooth Classic or BLE, and the communication method used for infrastructure connection can be Wi-Fi. Furthermore, in a case where the communication method used for transmission of AP information and an execution instruction and the communication method used for infrastructure connection are different from each other, the information processing apparatus 102 does not need to interrupt a connection to the AP before transmitting AP information. In other words, in S307, the information processing apparatus 102 can transmit, to the communication apparatus 101, AP information about an AP to which the information processing apparatus 102 is currently connected. Moreover, in a case where the communication method used for transmission of AP information and an execution instruction and the communication method used for infrastructure connection are different from each other, after transmitting AP information and an execution instruction, the information processing apparatus 102 does not need to interrupt a connection to the communication apparatus 101 performed with a communication method used for that transmission. Then, after transmitting AP information and an execution instruction, the information processing apparatus 102 can receive information indicating whether a connection to the AP is successful based on the AP information and the execution instruction and display such information.

While, in the above-described exemplary embodiment, for example, in S307 or S312, the information processing apparatus 102 transmits AP information to the communication apparatus 101, the present exemplary embodiment is not limited to this. In S307 or S312, the information processing apparatus 102 can transmit an execution instruction for simple connection processing. Moreover, before transmitting the execution instruction for simple connection processing, the information processing apparatus 102 can determine whether each of the AP and the communication apparatus 101 is compatible with simple connection processing. Moreover, after transmitting the execution instruction for simple connection processing, the information processing apparatus 102 can perform notification processing for prompting the user to perform an operation for performing simple connection processing.

While, in the above-described exemplary embodiment, for example, in S315, after transmitting the execution instruction for simple connection processing, the information processing apparatus 102 performs notification processing for prompting the user to perform an operation for performing simple connection processing, the present exemplary embodiment is not limited to this. For example, the information processing apparatus 102 can transmit the execution instruction for simple connection processing to not only the communication apparatus 101 but also an AP which is to be caused to perform simple connection processing. This configuration eliminates the need to perform a direct user operation not only on the communication apparatus 101 but also on the AP in performing simple connection processing.

The communication apparatus 101 can perform processing for determining whether the AP is compatible with simple connection processing. Then, the communication apparatus 101 can transmit a result of the determination to the information processing apparatus 102, and the information processing apparatus 102 can perform processing based on the received result of the determination.

An aspect of some embodiments can be attained by the following configuration. The configuration supplies a storage medium storing a program of software that implements the functions of the above-described exemplary embodiment to a system or apparatus, and causes a computer (including a CPU or a micro processing unit (MPU)) of the system or apparatus to read out and execute the program stored in the storage medium. In this case, the program itself read out from the storage medium implements the functions of the above-described exemplary embodiment, and the storage medium storing the program configures the embodiment.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-219686, which was filed on Nov. 22, 2018 and which is hereby incorporated by reference herein in its entirety.

What is claimed is:

1. A control method for an information processing apparatus, the control method comprising:
    receiving a predetermined instruction before processing for establishing a connection between the information processing apparatus and a communication apparatus is performed;
    establishing the connection between the information processing apparatus and the communication apparatus; and
    transmitting, to the communication apparatus via a connection between the information processing apparatus and the communication apparatus, an execution instruction for connection processing that is based on any one of AirStation One-Touch Secure System (AOSS) and Wi-Fi Protected Setup (WPS);
    wherein, in a case where the execution instruction has been received by the communication apparatus, the connection processing is performed by the communication apparatus;
    wherein, in a connection between the communication apparatus and an access point to be established by the connection processing, the access point operates as a master device and the communication apparatus operates as a slave device;
    wherein, in a case where at least the access point to which the information processing apparatus has been connected when the predetermined instruction has been received and the communication apparatus are not able to connect to each other, the execution instruction is transmitted; and
    wherein, in a case where at least the access point to which the information processing apparatus has been connected when the predetermined instruction has been received and the communication apparatus are able to connect to each other, the execution instruction is not transmitted.

2. The control method according to claim 1, further comprising determining whether the communication apparatus is able to perform the connection processing,
    wherein, in a case where it is determined that the communication apparatus is able to perform the connection processing, the execution instruction is transmitted to the communication apparatus, and
    wherein, in a case where it is determined that the communication apparatus is not able to perform the connection processing, the execution instruction is not transmitted to the communication apparatus.

3. The control method according to claim 1, further comprising, in a case where at least the access point to which the information processing apparatus has been connected when the predetermined instruction has been received and the communication apparatus are able to connect to each other, transmitting, to the communication apparatus via a connection between the information processing apparatus and the communication apparatus, the connection information for connecting to the access point to which the information processing apparatus has been connected when the predetermined instruction has been received,
    wherein the access point to which the information processing apparatus has been connected when the predetermined instruction has been received and the communication apparatus connect to each other based on the connection information for connecting to the access point to which the information processing apparatus has been connected when the predetermined instruction has been received.

4. The control method according to claim 1, further comprising acquiring, from the communication apparatus, a list of one or more access points each corresponding to the access point to which the communication apparatus is able to connect,
    wherein, in a case where at least the access point to which the information processing apparatus has been connected when the predetermined instruction has been received is not included in the list, at least the access point to which the information processing apparatus has been connected when the predetermined instruction has been received and the communication apparatus are not able to connect to each other, and
    wherein, in a case where at least the access point to which the information processing apparatus has been connected when the predetermined instruction has been received is included in the list, at least the access point to which the information processing apparatus has been connected when the predetermined instruction has been received and the communication apparatus are able to connect to each other.

5. The control method according to claim 4, further comprising:
    in a case where at least the access point to which the information processing apparatus has been connected when the predetermined instruction has been received is not included in the list, receiving selection of any one of the access points from the list;
    receiving inputting of the connection information for connecting to the selected access point; and
    determining whether the information processing apparatus is able to connect to the selected access point based on the input connection information,
    wherein, in a case where it is determined that the information processing apparatus is able to connect to the selected access point based on the input connection information, the connection information for connecting to the selected access point is transmitted to the communication apparatus via a connection between the information processing apparatus and the communication apparatus, and
    wherein, in a case where it is determined that the information processing apparatus is not able to connect to the selected access point based on the input connection information, the execution instruction is transmitted to the communication apparatus via a connection between the information processing apparatus and the communication apparatus.

6. The control method according to claim 1, further comprising:

searching for the communication apparatus via the access point to which the information processing apparatus is connected, after the execution instruction is transmitted; and re-transmitting the execution instruction in a case where the communication apparatus has not been found by the searching.

7. The control method according to claim 1, further comprising performing notification processing for prompting the user to perform, on the access point, an operation to cause the access point to perform the connection processing.

8. The control method according to claim 1, further comprising determining whether the access point input by the user is able to perform the connection processing,
wherein, in a case where it is determined that the access point input by the user is able to perform the connection processing, the execution instruction is transmitted to the communication apparatus, and
wherein, in a case where it is determined that the access point input by the user is not able to perform the connection processing, the execution instruction is not transmitted to the communication apparatus.

9. The control method according to claim 1, wherein the connection processing which the access point performs includes processing for issuing a predetermined beacon which the communication apparatus that is performing the connection processing is able to receive.

10. The control method according to claim 1, wherein the connection processing which the communication apparatus performs includes processing for searching for a beacon which the access point that is performing the connection processing issues and processing for acquiring the connection information from the access point that issues the beacon found by the searching.

11. The control method according to claim 1, wherein the connection information includes a password used to connect to an access point.

12. The control method according to claim 1, wherein a connection between the information processing apparatus and the communication apparatus is Wi-Fi.

13. The control method according to claim 1, wherein a connection between the information processing apparatus and the communication apparatus is a connection using Bluetooth Classic or Bluetooth Low Energy.

14. The control method according to claim 1, wherein a connection between the access point and the communication apparatus and a connection between the access point and the information processing apparatus are Wi-Fi.

15. The control method according to claim 1, wherein the communication apparatus is a printer which performs printing.

16. The control method according to claim 1, wherein, after the execution instruction is transmitted, a print job is transmitted to the communication apparatus via the access point.

17. A control method for an information processing apparatus, the control method comprising:
establishing a connection between the information processing apparatus and a communication apparatus;
transmitting, to the communication apparatus via a connection between the information processing apparatus and the communication apparatus, an execution instruction for connection processing that is based on any one of AirStation One-Touch Secure System (AOSS) and Wi-Fi Protected Setup (WPS);
searching for the communication apparatus via an access point to which the information processing apparatus is connected, after the execution instruction is transmitted; and
re-transmitting the execution instruction in a case where the communication apparatus has not been found by the searching;
wherein, in a case where the execution instruction has been received by the communication apparatus, the connection processing is performed by the communication apparatus; and
wherein, in a connection between the communication apparatus and the access point to be established by the connection processing, the access point operates as a master device and the communication apparatus operates as a slave device.

18. A control method for an information processing apparatus, the control method comprising:
establishing a connection between the information processing apparatus and a communication apparatus;
determining whether an access point input by a user is able to perform connection processing; and
transmitting, to the communication apparatus via a connection between the information processing apparatus and the communication apparatus, an execution instruction for connection processing that is based on any one of AirStation One-Touch Secure System (AOSS) and Wi-Fi Protected Setup (WPS);
wherein, in a case where the execution instruction has been received by the communication apparatus, the connection processing is performed by the communication apparatus;
wherein, in a connection between the communication apparatus and an access point to be established by the connection processing, the access point operates as a master device and the communication apparatus operates as a slave device;
wherein, in a case where it is determined that the access point input by the user is able to perform the connection processing, the execution instruction is transmitted to the communication apparatus; and
wherein, in a case where it is determined that the access point input by the user is not able to perform the connection processing, the execution instruction is not transmitted to the communication apparatus.

* * * * *